June 6, 1967  J. D. CHRISTIAN  3,323,160
SURFACE TREATING DEVICE

Filed July 30, 1965  2 Sheets-Sheet 1

INVENTOR
JOSEPH DENNIS CHRISTIAN
BY
Young + Thompson
ATTORNEYS

INVENTOR
JOSEPH DENNIS CHRISTIAN
BY
Young + Thompson
ATTORNEYS

United States Patent Office 3,323,160
Patented June 6, 1967

3,323,160
SURFACE TREATING DEVICE
Joseph Dennis Christian, World Trade Center,
San Francisco, Calif. 94111
Filed July 30, 1965, Ser. No. 476,024
5 Claims. (Cl. 15—21)

This invention relates to mechanism for converting rotary motion to reciprocatory motion.

One object of the invention is to provide mechanism of this kind having reduction gearing for slow reciprocation and capable of reciprocating a heavy load while having small dimensions transverse to the axis of reciprocation.

Another object of the invention is to enable the load to be simultaneously rotated and reciprocated on a common axis.

A particular application of the invention is to the rotation and reciprocation of surface treatment device such as a scratch brush used for brushing metal sheets before and/or after being passed through a rolling mill.

Figure 1:
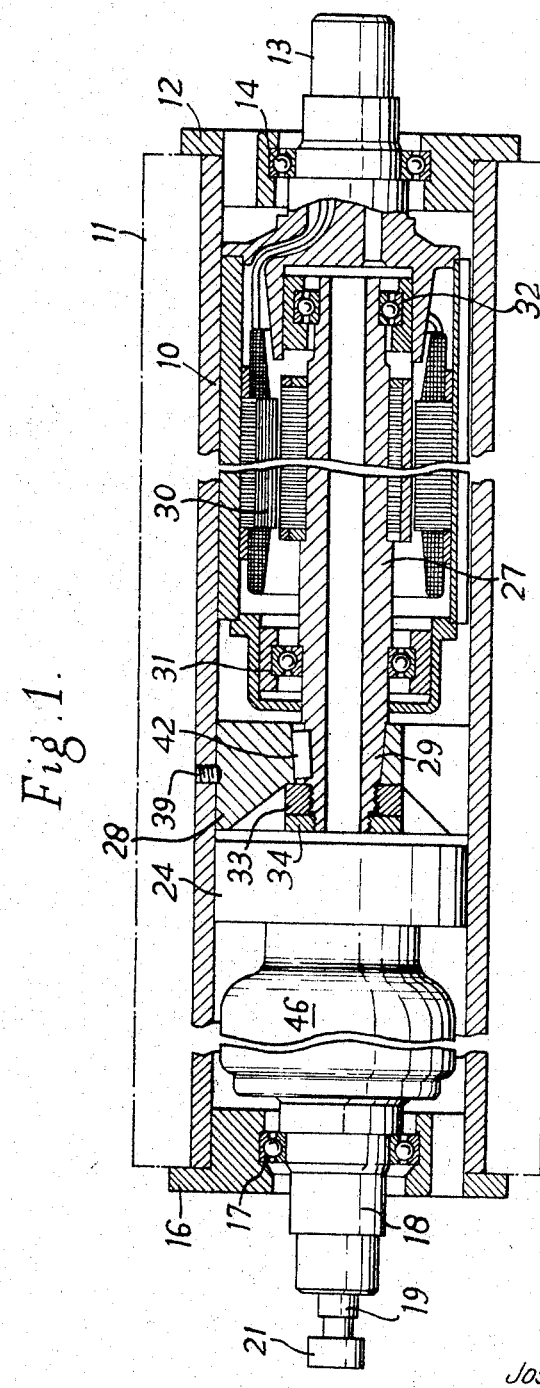
Figure 2:
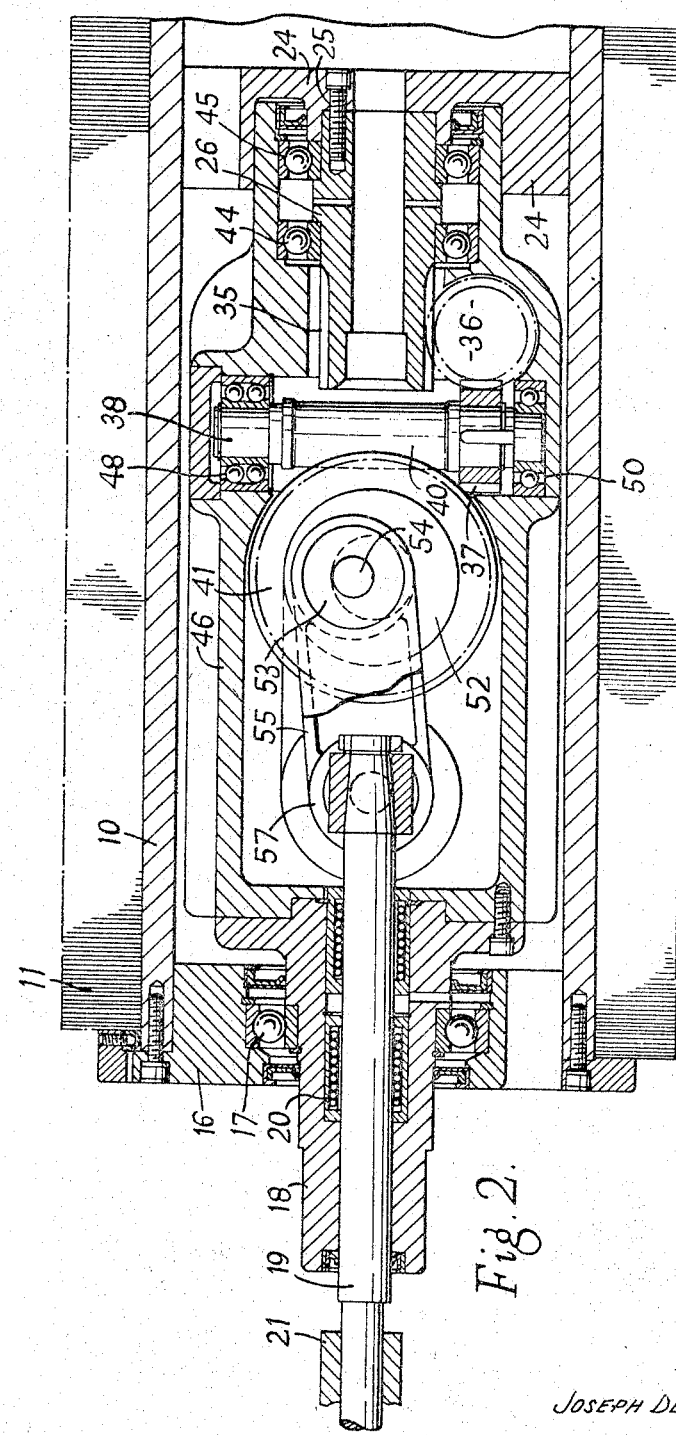

The invention will be described by way of example with reference to the accompanying drawings wherein:

FIGURE 1 is a view of a scratch brush made in accordance with the invention; and FIGURE 2 is a sectional view of part of FIGURE 1.

A tubular mandrel 10 carries a brush element 11 wound thereon. This mandrel carries an annular member in the form of a spider 12 at one end that is mounted rotatably by bearing 14 on a shaft 13 which reciprocates with the mandrel. At the other end the mandrel carries an annular member or spider 16 that is mounted by a bearing 17 on a sleeve 18. The sleeve 18 is mounted in any suitable support for reciprocatory non-rotary motion. The sleeve 18 is mounted for reciprocatory motion on a shaft 19 by means of ball bearings 20. Shaft 19 is fixed to a supporting structure 21.

The mandrel carries a third annular member or spider 24 which is fixed by screws 25 to a hollow shaft 26. The mandrel has a shrunk fit on a fourth annular member or spider 28 which is keyed by key 42 on to a hollow shaft 27 of an electric motor 30 which is housed within the mandrel. The motor 30 is carried on the shaft 13. The motor shaft 27 rotates in bearings 31, 32.

The spider 28 seats on a taper 29 on shaft 27 and is urged on to the taper 29 by nut 33 which is fixed by a lock-nut 34, and keyed by key 42.

The shaft 26 is cut with 45° spiral teeth 35 which mesh with a first spiral toothed wheel 36 and the latter meshes with a second spiral toothed wheel 37 that is fixed on a shaft 38. The shaft 38 is disposed with its axis transverse to the axis of the shaft 26 and carries a toothed member 40 which meshes with a worm-wheel 41 the axis of which is transverse both to the axis of the shaft 26 and to the axis of shaft 38.

Thus the motor drives the mandrel through spider 28 and the mandrel drives the eccentric reciprocating means through spider 24.

The shafts 26, 38 and worm-wheel 41 are all mounted for rotation in a tubular support member 46. The shaft 26 is mounted in said support member by bearings 44, 45. The shaft 38 is mounted in a thrust bearing 48 at one end and in a bearing 50 at the other end. The worm-gear 37 develops thrust on shaft 38 in one direction and gear 40 also develops thrust on shaft 38 in the opposite direction. The resultant thrust is therefore small and contained by the double-row thrust bearing 48 so that the thrust loading on bearing 50 is only nominal and substantially only radial load occurs on bearing 50 from the bevel wheel 36.

The worm-wheel 41 is supported in member 46 by bearing 52. The worm-wheel 41 has a bore the axis of which is offset from the axis of the worm-wheel. In this bore is a shaft 53 which carries a crank pin 54. A connecting rod 55 is mounted at one end on the crank pin 54 and at its other end is connected by a pivotal joint 57 to the shaft 19. The support member 46 is attached to sleeve 18 so that this member 46 and the reciprocating linkage 52–57 are restrained from rotating.

Thus a first member or shaft 19 and a second member 46 are connected together by means for converting rotary motion to reciprocatory motion, which means also including reduction gearing. The member 46 and all parts connected to it including the mandrel are caused to reciprocate along the common axis of the shafts 19, 27 and mandrel 10.

In a particular example the weight of the reciprocating parts is about 2,500 to 3,000 lbs. and the frequency of reciprocation is 30 to 60 times per minute. The structure therefore, must be massively built to contain the forces developed in transmitting power through the reduction gears and eccentric. However, this is accomplished by means of the present invention by means which is of small dimensions transversely of the axis so that it can be contained within the scratch brush mandrel.

The spiders 16, 24, 28, 12 have spiral blades which serve to propel air through the mandrel to cool it and the mechanism within it and if required to carry a mist of lubricant with it. The spiders may be additionally fixed by grub-screws such as 39.

The mandrel in other respects may be similar to that described in United States Patent No. 3,178,744.

I claim:

1. Mechanism for converting rotary motion to reciprocatory motion, comprising a rotatable tubular mandrel, an electric motor located within the mandrel, means outside the mandrel for supporting one end of the motor and for rotatably carrying the adjacent end of the mandrel, a non-rotary member partly extending within the other end of the mandrel, a non-rotary device located within the mandrel, a first shaft located within the mandrel and drivably connected with the mandrel and having spiral gear teeth thereon, the shaft of the electric motor being drivably connected with the first shaft, a first spiral gear wheel meshing with said spiral gear teeth, a second shaft transverse to the first shaft, a second spiral gear wheel on said second shaft meshing with said first spiral gear wheel, the first and second shafts and the first spiral gear wheel being rotatably mounted in the device, a worm-wheel meshing with teeth carried by the second shaft, the worm-wheel having its axis transverse to that of both the first and second shafts, eccentric means drivably connecting the worm-wheel with the said non-rotary member, and bearing means supporting said other end of the mandrel on said device, whereby the mandrel can be rotated and relative reciprocal motion effected between the said non-rotary member and said device.

2. Mechanism as claimed in claim 1, wherein said non-rotary member is a shaft, and said device includes a sleeve and bearing means, whereby the sleeve is slidably mounted on said non-rotary member, the sleeve extending out of the mandrel, the mechanism further comprising first and second annular end members attached to the mandrel at the ends thereof, the first annular member being rotatably mounted on the sleeve by means of said bearing means, a second mandrel bearing means carried by said supporting means, the second annular member being rotatably mounted on said second bearing means and a third annular member located within the mandrel and connected to the mandrel and to said first shaft.

3. A surface treating device comprising a tubular mandrel for carrying surface treating means, a non-rotary member partly extending within the mandrel, a non-rotary device located within the mandrel, said mandrel being rotatably mounted on said device and connected to said device for reciprocatory motion therewith, a first shaft located within the mandrel and drivably connected with the mandrel and having spiral gear teeth thereon, a first spiral gear wheel meshing with said spiral gear teeth, a second shaft transverse to the first shaft, a second spiral gear wheel on said second shaft meshing with said first spiral gear wheel, the first and second shafts and the first spiral gear wheel being rotatably mounted in the device, a worm-wheel meshing with teeth carried by the second shaft, the worm-wheel having its axis transverse to that of both the first and second shafts, eccentric means drivably connecting the worm-wheel with said member, an electric motor located within the mandrel, and means for supporting the electric motor, the electric motor having a shaft drivably connected with the mandrel, whereby the mandrel can be rotated and reciprocated with respect to said member.

4. A surface treating device comprising a tubular mandrel for carrying surface treating means, fixed shaft members at opposite ends of the mandrel supporting the mandrel rotatably, an electric motor disposed within the mandrel and carried by one of the fixed shaft members, the electric motor having a shaft drivably connected with the mandrel by means of an annular member, the annular member being located within the mandrel and fixed on the shaft of the electric motor and to the mandrel, another annular member located within the mandrel and fixed to the mandrel, a shaft within the mandrel fixed to the second mentioned annular member, a reciprocable member within the mandrel, a rotary member carried by said reciprocable member, reduction gearing drivably connecting said rotary member to said shaft within the mandrel, and reciprocating drive means connecting said rotary member to the other of said fixed shaft members so as to reciprocate said reciprocable member and mandrel axially of the mandrel while the latter rotates.

5. A surface treating device comprising a tubular mandrel for carrying surface treating means, fixed shaft members at opposite ends of the mandrel, two annular spider members fixed within the mandrel within the ends thereof for carrying the mandrel rotatably on the fixed shaft members, an electric motor located within one end of the mandrel and carried by one of the fixed shaft members, a third annular spider member fixed to the shaft of the electric motor and to the mandrel, a fourth annular spider member fixed to the mandrel, gear reduction means driven by the fourth annular spider member, and reciprocating means for reciprocating the mandrel drivably connected to the gear reduction means, said annular spider members all having blades for propelling air through the mandrel.

References Cited

UNITED STATES PATENTS

| 1,352,583 | 9/1920 | Clarke | 51—176 |
| 1,793,053 | 2/1931 | Cahill et al. | |
| 2,298,792 | 10/1942 | Hicks. | |
| 3,238,550 | 3/1966 | Christian | 15—21 |

FOREIGN PATENTS 503,763   7/1930   Germany.

MILTON KAUFMAN, *Primary Examiner.*

FRED C. MATTERN, *Examiner.*

D. H. THIEL, *Assistant Examiner.*